PHASE DIFFERENTIAL COMPENSATION CIRCUIT

Filed Dec. 11, 1964

INVENTORS.
FRANK J. SORDELLO
GEORGE J. THALER
BY
AGENT

United States Patent Office 3,310,732

Patented Mar. 21, 1967

3,310,732

PHASE DIFFERENTIAL COMPENSATION CIRCUIT

Frank J. Sordello, San Jose, and George J. Thaler, Carmel, Calif., assignors to International Business Machines Corporation, New York, N.Y., a corporation of New York Filed Dec. 11, 1964, Ser. No. 417,671
6 Claims. (Cl. 323—101)

This invention relates to a circuit which compensates for phase differentials existing in electrical signals. More particularly, it relates to such a circuit wherein the direct current and the low frequency, alternating current components of a signal are passed with negligible attenuation, and the high frequency, alternating current components are amplified so as to substantially eliminate any phase lead or lag present in the original electrical signals.

Prior art electrical systems employing signals having a number of different frequencies have been faced with the problem of establishing a corrected phase for these signals. In some instances, the phase of some components leads that of others (i.e., is a certain number of degrees ahead of other components) and in other instances, there is a phase lag (i.e., some components are a certain number of degrees behind others).

Phase compensation networks have been known to the prior art. Although providing workable solutions to this problem of phase differential, prior art devices have created additional problems of their own.

As an initial step to the solution of this problem, prior art devices have resorted to so-called passive networks; these normally comprise an RC circuit along with an additional resistance. A discussion of these prior art networks may be found on p. 233 of "Analysis and Design of Feedback Control Systems" by Thaler and Brown; 2nd ed., McGraw-Hill, 1960.

Such circuits have been able to accomplish a phase angle shift, but only at the expense of a significant decrease in direct current gain. Direct current gain, when diminished, introduces adverse effects in the operation of related equipment. So, the gain must be restored. To do that, it is necessary to insert a direct current amplifier in cascade with the passive network of the prior art. A further requirement then arises that the direct current amplifier have a low drift. This means that it must be designed with precision and use high quality, components. Consequently, the cost of this direct current amplifier is high, and it adds to the over-all cost of the phase compensation network.

Accordingly, it is a general object of this invention to provide an improved phase compensation circuit capable of overcoming the difficulties and shortcomings of prior art apparatus.

It is a more particular object of this invention to provide an improved phase differential compensation circuit for establishing a desired phase relationship amongst the different frequency components of an electrical signal.

It is another object of this invention to provide an improved phase differential compensation circuit for establishing a phase relationship between alternating current components and direct current components of an electrical signal.

Still another object of this invention is to provide an improved phase differential compensation network for establishing a phase relationship between groups of frequency components present within an electrical signal.

Yet another object of this invention is to provide an improved phase differential compensation circuit for establishing a phase relationship between groups of frequency components within an electrical signal wherein a first group generally contains high frequency, alternating current components and a second group contains low frequency, alternating current components as well as direct current components.

Yet another object of this invention is to provide an improved phase differential compensation circuit for utilization within a servomechanism system.

Our invention then resides in providing an apparatus which is responsive to the different frequency components present in electrical signals. Electrical signals available from a signal generator are impressed upon the terminals of an electrical circuit having essentially two paths. These paths are arranged in parallel. The first path is responsive to all components and passes these components in a substantially non-attenuated manner. The second path is responsive only to the high frequency, alternating current component present in the impressed signals. The second path contains means for amplifying the latter component. The amplifying device may comprise any voltage amplifying device so long as it blocks direct current; however, in a preferred embodiment, transformer means are utilized to perform the amplifying function. By varying the design characteristics of the various components, the phase compensation may be tailored to particular requirements.

Our invention offers a number of significant advantages. For instance, by passing the direct current components in a substantially non-attenuated manner, it is no longer necessary to utilize an expensive direct current amplifier to restore lost direct current gain—since the gain is maintained substantially constant. This absence of a direct current amplifier becomes of increasing significance when the circuit of the instant invention is employed in a system requiring minimal drift; e.g., a servo system. In such a servo system, the accuracy of the output is an inverse function of the amount of direct current drift present. Since direct current drift is inherent in direct current amplifiers, its presence can be avoided by removing the necessity for direct current amplifiers.

Not only do advantages arise from the absence of a direct current amplifier, but advantages also arise from the high frequency, alternating current amplification employed herein. By employing a capacitor with a simple alternating current amplifier, any direct current levels will be blocked out of the alternating current path (and amplifier). Accordingly, the alternating current amplifier may be an inexpensive, unsophisticated component and still operate satisfactorily.

When the transformer means of the preferred embodiment are employed, still further advantages are present. A transformer has the advantage of consistent gain as compared to a conventional alternating current amplifier; alternating current amplifiers are not as stable as a transformer in this environment. Even though an emitter follower driver may be employed to activate the transformer means, stability is not destroyed—the emitter follower driver is also a stable element. Still another distinct advantage flows from the utilization of transformer means. The parameters of the transformer, including the primary inductance and resistance as well as the secondary resistance, are used as elements of the phase lead network. Circuit design is thus simplified, components minimized, and cost decreased.

The entire circuit assumes particular importance when placed in the environment of a servo system. Absent such a circuit, oscillation is apt to occur and destroy the effectiveness of a servo system. The circuitry of the subject invention thus contributes to the efficient operation of ancillary apparatus as well.

In summary then the apparatus of this invention offers a simple, inexpensive, and yet highly efficient phase differential compensation circuit.

The foregoing and other objects, features and advantages of this invention will be apparent from the following more detailed description of a preferred embodiment of the invention as illustrated in the accompanying drawings.

Figure 1:
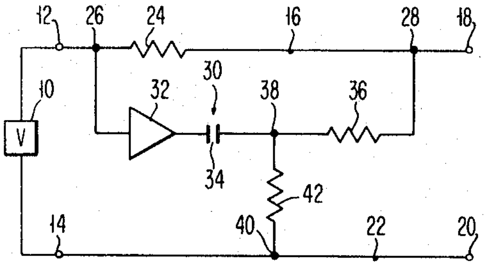
FIG. 1 represents a schematic diagram of the basic invention.

FIG. 1 shows the essential elements of this invention. Voltage source 10 impresses a voltage across input terminals 12, 14. It should be recognized that source 10 could, under certain circumstances, be a current source. The voltage from source 10 is in the form of a series of signals having a number of different frequency components—among those components being at least a direct current component; a high frequency, alternating current component; and a low frequency, alternating current component. Extending from input terminal 12 is a conductor 16 leading to one terminal 18 of a pair of output terminals 18, 20. Likewise, extending from input terminal 14 is a conductor 22 leading to output terminal 20. Disposed in conductor 16 is resistor 24 which enables the direct current components as well as the alternating current components of all frequencies present in the incoming signals to pass in a substantially non-attenuated manner. Extending between terminals 26 and 28 is a second conductive path shown generally as 30; conductive path 30 thereby being arranged in parallel with the conductive path comprising conductor 16 and resistor 24. Conductive path 30 has an amplifier 32, capacitor 34 and summing resistor 36 arranged in series. Also, extending from terminal 38 to terminal 40 is a resistor 42. Resistor 42, in cooperation with amplifier 32 and capacitor 34, determines the phase lead and lag corners, which are shown as points C and D respectively in FIG. 2. Conductive path 30 serves to amplify the high frequency, alternating current components present within the voltage signal impressed across input terminals 12, 14.

It should be noted at this pint that the only requirement for conductive path 30 is that it contain suitable means for amplifying such high frequency, alternating current components, and it is not meant to be limited to any particular amplifying means. Any voltage amplifying device that will block direct current components while amplifying high frequency, alternating current components may be utilized; it may comprise either a conventional amplifier, such as amplifier 32, or transformer means as will become apparent subsequently.

With continued reference to FIG. 1, it should be noted that the components represented there may have their values inter-changed so as to accomplish various phase shifting operations. However, there are several general observations that may be made and they may be expressed mathematically:

$$C_{34}R_{42}(1+A_{32})>C_{34}R_{42}$$

where:

$C_{34}$=the capacitance of capacitor 34,
$R_{42}$=the resistance of resistor 42,
$A_{32}$=the quantitative amplification performed by amplifier 32.

So long as $A_{32}$ is significantly greater than 1, the above nonequality is valid.

The relationship between capacitor 34 and resistor 42 for determining phase lead and lag corners may also be expressed mathematically:

$$\frac{E_x}{E_y}=\frac{sR_{42}C_{34}}{sR_{42}C_{34}+1}$$

as long as $R_{36}>>R_{42}$, where:

$E_x$=the voltage to the right of terminal 38 in FIG. 1;
$E_y$=the voltage to the left of terminal 38;
$R_{42}$=the resistance of resistor 42;
$C_{34}$=the capacitance of capacitor 34; and
$s$=complex frequency of the source (or $j\omega$);

and:

$$\frac{E_y}{E_2}=A$$

where:

$E_y$ is defined above; and
$E_2$=the voltage from source 10.

Therefore:

$$\frac{E_x}{E_2}=\frac{E_x}{E_y}\cdot\frac{E_y}{E_2}=\frac{AsR_{42}C_{34}}{sR_{42}C_{34}+1}$$

And:

$$\frac{E_{out}}{E_2}\approx\frac{1+AsR_{42}C_{34}}{sR_{42}C_{34}+1}=\frac{[1+A]sR_{42}C_{34}+1}{sR_{42}C_{34}+1}$$

where: the numerator identifies the lead and the denominator identifies the lag, if ideal summing is achieved across terminals 18, 20.

Continuing with the general observations, it should be noted that so long as the resistance of resistor 36 is significantly greater than the resistance of resistor 24 the attenuation of those frequencies passed through conductor 16 will be minimized.

In operation, the apparatus of FIG. 1 allows a series of signals to be provided from voltage source 10. The voltage signals supplied to terminals 12, 14 have a plurality of components including at least direct current components; low frequency, alternating current components; and high frequency, alternating current components. At terminal 26, the direct current components and all the alternating current components travel through resistor 24 and along conductive path 16 in a substantially non-attenuated manner. The direct current and low frequency, alternating current components are blocked from passing through path 30 by capacitor 34. Thus, the high frequency alternating current components are shunted through path 30 and amplified by amplifier 32. The resulting signals are scaled by resistor 36 and then summed at terminal 28 with those components that have passed in a substantially non-attenuated manner. Output signals are then available across terminals 18, 20 and they have undergone a phase shift—the amount of phase shift being a function of the particular components employed.

Figure 2:
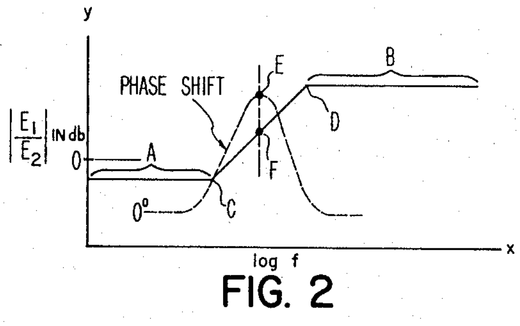
FIG. 2 represents a plot of operating characteristics for the apparatus of FIG. 1.

FIG. 2 represents graphically a plot of certain operating characteristics of the apparatus represented in FIG. 1. The Y coordinate of FIG. 2 represents the gain in decibels of the apparatus and may be expressed by some quantity (e.g., 20) times the log of the ratio of output voltage to input voltage. The X coordinate represents a log of the frequencies. $E_1$ represents the output voltage at terminals 18, 20 and $E_2$ represents the voltage from source 10. Plotted here are two curves, one representing the phase shift (shown in dotted lines) and the other representing the gain of the various components (shown in solid lines). That portion of the solid line represented by A is an indication of the direct current components and low frequency, alternating current components that have passed through the conductive path 16 in a substantially non-attenuated manner. Notice that these components experience very little change in their gain—neither an increase nor a decrease. Point C of that curve may be identified as the lead corner. Likewise, point D represents the lag corner. That portion of the solid curve represented by B represents the high frequency, alternating current components and the amount of amplification (or gain) experienced by them. Notice that the amplification is always some value greater than 1, and is determined by the amount of phase shift to be introduced in the system. The phase shift curve shown in dotted fashion will always have its apex E in alignment with the center F of the segment CD.

Figures 3, 4, 5:
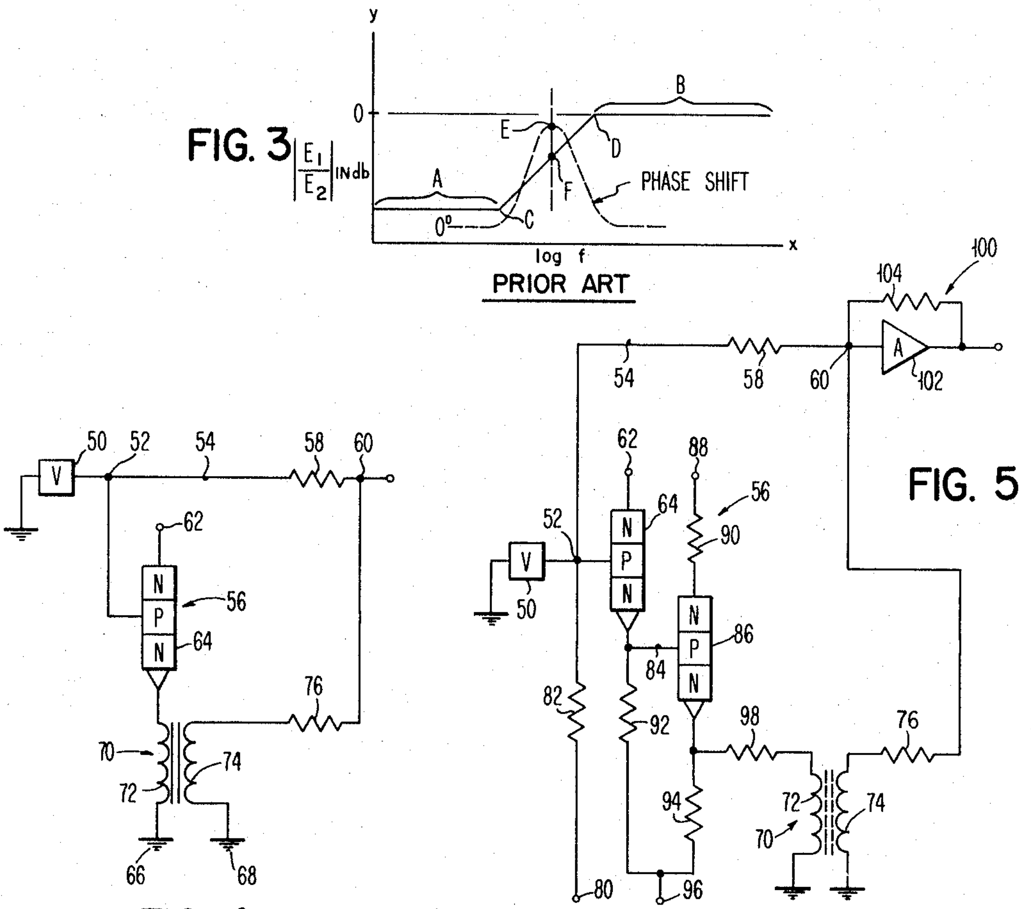
FIG. 3 represents a plot of similar operating characteristics for typical prior art apparatus.
FIG. 4 represents a preferred embodiment of the instant invention utilizing transformer means for amplification.
FIG. 5 represents a schematic of an actual example of the preferred embodiment.

FIG. 2 will become more meaningful when viewed in conjunction with FIG. 3, which represents the characteristics of certain conventional prior art apparatus referenced in the introductory portion of this specification. Similar numerals and letters have been used in FIG. 3 so as to mark corresponding portions of the curve represented there. Notice that the Y axis in FIG. 3 also represents gain and the X axis represents a log of the frequency. There is a solid line in FIG. 3 comprising line A, segment CD, and line B. Likewise, there is a dotted curve representing the phase shift accomplished. Notice that for any value of phase shift desired, the lead corner C always occurs at a negative gain value; this represents the deterioration in gain undergone by the direct current component. This problem is also referenced in the introductory portion of the specification. In a like manner, the high frequency, alternating current components are not amplified, but are passed in a non-attenuated manner. Therefore, they undergo no gain. As the phase shift increases in value, the lead corner C will be plotted at an increasingly more negative point with reference to the Y axis. Thus, for greater phase shifts, the passed signals suffer greater gain deterioration; the direct current amplifier must be able to restore more and more gain, and therefore is more expensive and more complex. The relationship between the apex of the phase shift curve and the geometric center of the segment CD remains as specified in FIG. 2.

So far, the basic components present in the invention have been set forth and their operation described by words and graphs. A preferred embodiment of the invention is set forth in FIG. 4 and will be described now. That embodiment utilizes transformer means to effect amplification of the high frequency, alternating current components.

FIG. 4 shows a source of signals 50 which supplies a signal to terminal 52. At terminal 52, two paths are provided and they are labelled generally path 54 and path 56. Path 54 contains a summing resistor 58 and extends to terminal 60. Path 54 and resistor 58 serve to pass the direct current components and all alternating current components of the signal applied to terminal 52 in a substantially non-attenuated manner. Path 56 will handle high frequency, alternating current components. Path 56 comprises a source of direct current power supply voltage 62 biasing a transistor driver 64. Interposed between transistor 64 and ground terminals 66, 68 is a transformer 70. Transformer 70 has a primary coil 72 and a secondary coil 74. Connected between terminal 60 and the secondary winding 74 of transformer 70 is a summing resistor 76. Transformer 70 amplifies the high frequency, alternating current components, and the amplification imparted is determined by the turns ratio; that is, if the ratio of turns in winding 74 to the ratio of turns in winding 72 is $x$ units then the amplification effected by that transformer will be $x$ also. Thus, when the high frequency, alternating current components pass through that portion of the circuit identified as 56 they are amplified and summed with the substantially non-attenuated components from path 54 at terminal 60.

FIG. 5 shows an actual example of the basic apparatus set forth in FIG. 4, with the additional components necessary to ensure a satisfactory operation in an actual environment. Corresponding elements in FIG. 5 are labeled with the same numbers as those in FIG. 4. A voltage signal having a maximum swing capability of $\pm 10$ volts is applied at terminal 52. There, the D.C. components of that voltage signal as well as all frequency, alternating current components travel along path 54 through resistor 58 which has a value of 220,000 ohms. The substantially non-attenuated signal arrives at terminal 60. The high frequency, alternating current components of the signal applied at terminal 52 travel through circuit 56 shown generally and which may have a heat sink added; the heat sink is not necessary for operation, but is included so as to provide a fuller teaching of applicants' invention. It may be noted here that terminal 80 has a biasing resistor 82 having a value of 20,000 ohms connected between terminal 52 and terminal 80. A source of direct current power supply voltage is applied at terminal 80. A source of direct current power supply voltage is applied at terminal 62, and in this example is +12 volts. The 12 volt power supply is supplied to the collector of the emitter follower driver circuit represented by transistor 64. Transistor 64 may be a Fairchild 2N1613 transistor, or a General-Electric 2N332—both cited by way of example only. Actually, any NPN transistor of proper parameters can be used. Likewise, PNP transistors could be used if the biasing polarities were reversed. A concurrence of the +12 volt power supply at the collector of transistor 64 with the high frequency, alternating current components at the base of transistor 64 causes transistor 64 to conduct, and supply a signal along conductor path 84. This signal passes onto the base of transistor 86. Transistor 86 is also connected to a +12 volt D.C. source 88. The 12 volt D.C. is supplied through a 20 ohm resistor 90 to the collector of transistor 86. Transistor 86 may likewise be any NPN transistor of the type mentioned previously. Likewise, a PNP transistor may be used with reversal of the biasing polarities. Both transistors 64 and 86 have their emitters tied through resistors 92 and 94 respectively to a power supply source 96. In this example, resistor 92 has a value of 22,000 ohms and resistor 94 has a value of 1,500 ohms, while power supply source 96 is at a −36 volt potential. Upon a concurrence of signals at the base of transistor 86 and the power supply voltage at the collector of transistor 86, an output will appear at the emitter and pass through resistor 98 having a value of 620 ohms to transformer circuit 70. Transformer 70 has a primary winding 72 tied to ground and a secondary winding 74 tied to ground. Any suitable transformer may be used and the ratio of the secondary windings to primary windings will determine the gain factor established by that transformer. Disposed between the secondary winding 74 of the transformer 70 and terminal 60 is a resistor 76 having a value of 200,000 ohms. To the right of the terminal 60 may be, for example, a gain of one summing amplifier shown generally as 100 and comprising an amplifier 102 and a resistor 104 having a value of 220,000 ohms. The apparatus of FIG. 5 can accomplish a phase shift of fifty degrees.

While the invention has been particularly shown and described with reference to a preferred embodiment thereof, it will be understood by those skilled in the art that the foregoing and other changes in form and detail may be made therein without departing from the spirit and scope of the invention.

We claim:

1. Apparatus for compensating for phase differentials present in electrical signals comprising in combination:
generating means for generating signals having a plurality of frequency components;
amplifying means directly coupled, and responsive, to said generating means for amplifying only high frequency, alternating current components present in said signals; and
means responsive to said generating means for passing all other frequency components present in said signals, said last-recited means passing said last-recited frequency components in a substantially non-attenuated manner, and said last-recited means being wired in electrical parallel with said amplifying means.

2. An electrical circuit for signal phase differential compensation comprising:

signal generating means for generating signals having a plurality of frequency components including at least a high frequency, alternating current component and a direct current component;

dividing means responsive to said signal generating means for dividing individual ones of said signals into said high frequency, alternating current component and said direct current component, said dividing means comprising a first conductive path having a resistance therein and a second conductive path having an amplifier therein, said first and said second conductive paths being arranged in electrical parallel;

whereby said first conductive path allows at least said direct current component to pass in a substantially non-attenuated manner and said second conductive path amplifies only said high frequency, alternating current component.

3. Apparatus for compensating for phase differentials present in electrical signals comprising in combination:

generating means for generating signals having a plurality of frequencies;

amplifying means responsive to said generating means for amplifying only high frequency, alternating current components present in said signals, said amplifying means comprising transformer means; and means responsive to said generating means for passing all other frequencies present in said signals, said last-recited means being wired in electrical parallel with said amplifying means.

4. An electrical circuit for phase differential compensation comprising:

signal generating means for generating signals having a plurality of frequency components including a high frequency, alternating current component and a direct current component;

dividing means responsive to said signal generating means for dividing individual ones of said signals into said high frequency, alternating current component and said direct current component, said dividing means comprising a first conductive path having a resistance therein and a second conductive path having an amplifier therein, said amplifier including a source of voltage, a transistor jointly responsive to said source of voltage and said alternating current component and a transformer responsive to said transistor, said first and said second conductive paths being arranged in electrical parallel;

whereby said first conductive path passes at least said direct current component in a substantially non-attenuated manner and said second conductive path amplifies only said high frequency, alternating current component.

5 An electrical circuit for signal phase differential compensation comprising:

signal generating means for generating signals having a plurality of components including at least a high frequency alternating current component, a low frequency alternating current component and a direct current component;

dividing means responsive to said signal generating means for dividing individual ones of said signals into a first and second group of components, said first group of components comprising at least direct current and low frequency, alternating current components, and said second group of components comprising at least high frequency, alternating current components, said dividing means comprising a first conductive path having a first resistance therein and a second conductive path having an amplifier, a capacitance, a second resistance and a third resistance therein, said capacitance and said second resistance being connected in series and said third resistance being connected at one of its terminals between said capacitance and said second resistance and at its other terminal to ground potential, said first and said second conducting paths being arranged in electrical parallel;

whereby said first conductive path passes at least said first group of components in a substantially non-attenuated manner and said second conductive path amplifies only said second group of components.

6. An electrical circuit for phase differential compensation of the type set forth in claim 5 wherein said amplifier comprises a transformer comprising a primary winding having a first plurality of turns and a second winding having a second plurality of turns, the ratio of said second plurality of turns to said first plurality of turns being a quantitative representation of the amplification of said second group of components.

References Cited by the Examiner

UNITED STATES PATENTS

| | | | |
|---|---|---|---|
| 2,143,386 | 1/1939 | Roberts | 323—119 X |
| 2,164,402 | 7/1939 | Guanella | 323—119 X |
| 2,606,966 | 8/1952 | Pawley | 323—119 X |
| 2,940,048 | 6/1960 | Kenny | 328—155 |
| 3,047,815 | 7/1962 | Boose | 330—86 |

OTHER REFERENCES

Thaler and Brown: "Analysis and Design of Feedback Control Systems," McGraw-Hill 1960, second edition, TJ214T4, page 233.

JOHN F. COUCH, *Primary Examiner.*

A. D. PELLINEN, *Assistant Examiner.*